United States Patent
Kodama et al.

(10) Patent No.: US 7,050,499 B2
(45) Date of Patent: May 23, 2006

(54) VIDEO ENCODING APPARATUS AND METHOD AND VIDEO ENCODING MODE CONVERTING APPARATUS AND METHOD

(75) Inventors: Tomoya Kodama, Kawasaki (JP); Noboru Yamaguchi, Yashio (JP); Atsushi Matsumura, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 107 days.

(21) Appl. No.: 10/669,356

(22) Filed: Sep. 25, 2003

(65) Prior Publication Data

US 2004/0125876 A1 Jul. 1, 2004

(30) Foreign Application Priority Data

Sep. 26, 2002 (JP) ............................. 2002-280293
Feb. 20, 2003 (JP) ............................. 2003-042078

(51) Int. Cl.
*H04N 7/12* (2006.01)

(52) U.S. Cl. ................................. 375/240.12
(58) Field of Classification Search ............ 375/240.12, 375/240.13, 240.14, 240.15, 240.16; 348/699–700; 382/236, 238; 386/111
See application file for complete search history.

(56) References Cited

U.S. PATENT DOCUMENTS

| 6,654,420 B1 * | 11/2003 | Snook ................... 375/240.16 |
| 6,704,360 B1 * | 3/2004 | Haskell et al. ......... 375/240.12 |
| 6,775,326 B1 * | 8/2004 | Sekiguchi et al. ..... 375/240.14 |
| 6,785,331 B1 * | 8/2004 | Jozawa et al. ......... 375/240.12 |
| 6,816,552 B1 * | 11/2004 | Demos ................... 375/240.15 |
| 2002/0181591 A1 * | 12/2002 | Francois et al. ....... 375/240.16 |
| 2003/0099294 A1 * | 5/2003 | Wang et al. ........... 375/240.15 |
| 2003/0128761 A1 * | 7/2003 | Zhou ..................... 375/240.16 |
| 2003/0133502 A1 * | 7/2003 | Yagasaki et al. ....... 375/240.13 |

FOREIGN PATENT DOCUMENTS

JP 11-98514 4/1999
JP 2002-218470 8/2002

* cited by examiner

*Primary Examiner*—Vu Le
(74) *Attorney, Agent, or Firm*—Oblon, Spivak, McClelland, Maier & Neustadt, P.C.

(57) ABSTRACT

A video encoding apparatus comprises a motion vector detector to detect a motion vector of an input picture referring to a reference picture, and a predictive encoder to perform forward predictive encoding and bidirectional predictive encoding using the motion vector and the reference picture, the forward predictive encoder subjecting the macroblock of the forward predictive encoded picture to a variable length encoding in not_coded mode when a correlation between the macroblocks of the forward and bidirectional predictive encoded pictures and the reference picture which are located at the same position is high.

4 Claims, 10 Drawing Sheets

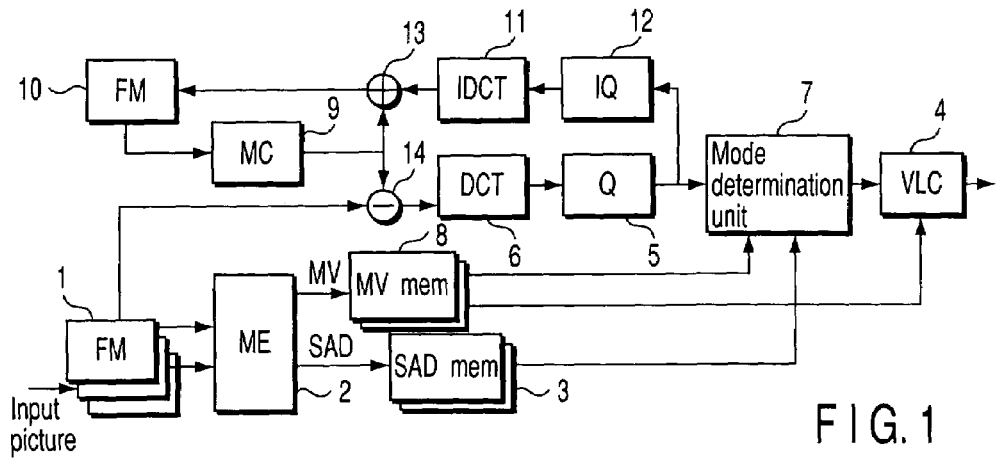

FIG. 1

| Process order | 0 | 1 | 2 | 3 | 4 | 5 | 6 | 7 |
|---|---|---|---|---|---|---|---|---|
| Input frame | I0 | P1 | B2 | B3 | P4 | B5 | B6 | P7 |
| Frame to be subjected to forward motion detection | | P1 | B2 | B3 | P4 | B5 | B6 | P7 |
| Forward motion detection reference frame | | I0 | P1 | P1 | P1 | P4 | P4 | P4 |
| Frame to be subjected to backward motion detection | | | | | B3 | B2 | | |
| Backward motion detection reference frame | | | | | P4 | P4 | | |
| Forward motion compensated frame | | | | I0 | P1 | P1 | P1 | P4 |
| Backward motion compensated frame | | | | | | P4 | P4 | |
| Frame to be subjected to DCT/Q/IQ/IDCT/VLC | | | I0 | P1 | P4 | B2 | B3 | P7 |

FIG. 2

| Process order | 0 | 1 | 2 | 3 | 4 | 5 | 6 | 7 |
|---|---|---|---|---|---|---|---|---|
| Input frame | I0 | P1 | B2 | B3 | P4 | B5 | B6 | P7 |
| Frame to be subjected to forward motion detection | | | | P1 | P4 | B2 | B3 | P7 |
| Forward motion detected reference frame / forward motion compensated frame | | | | I0 | P1 | P1 | P1 | P4 |
| Frame to be subjected to backward motion detection | | | | | | B2 | B3 | |
| Backward motion detected refernce frame / backward motion compensated frame | | | | | | P4 | P4 | |
| Frame to be subjected to DCT / Q / IQ / IDCT / VLC | | | I0 | P1 | P4 | B2 | B3 | P7 |

FIG. 8

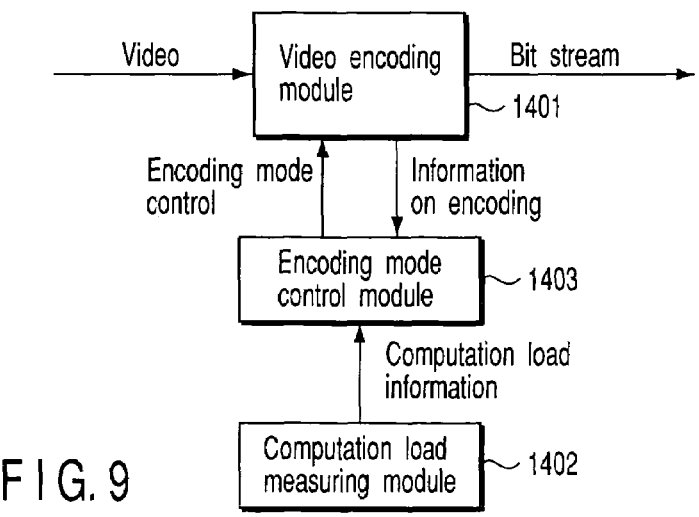

FIG. 9

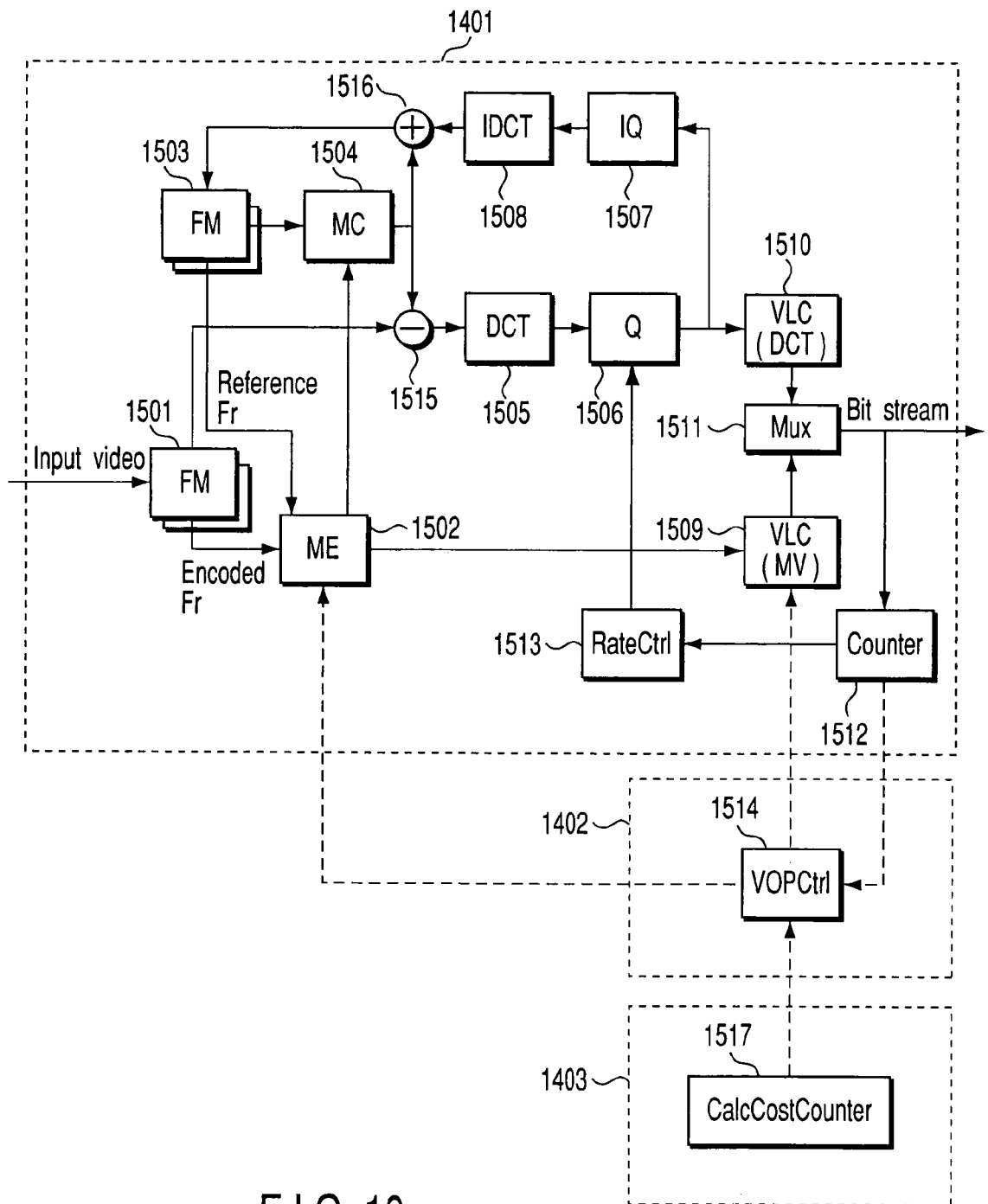
F I G. 10

Motion vector difference is small

Motion vector difference is large

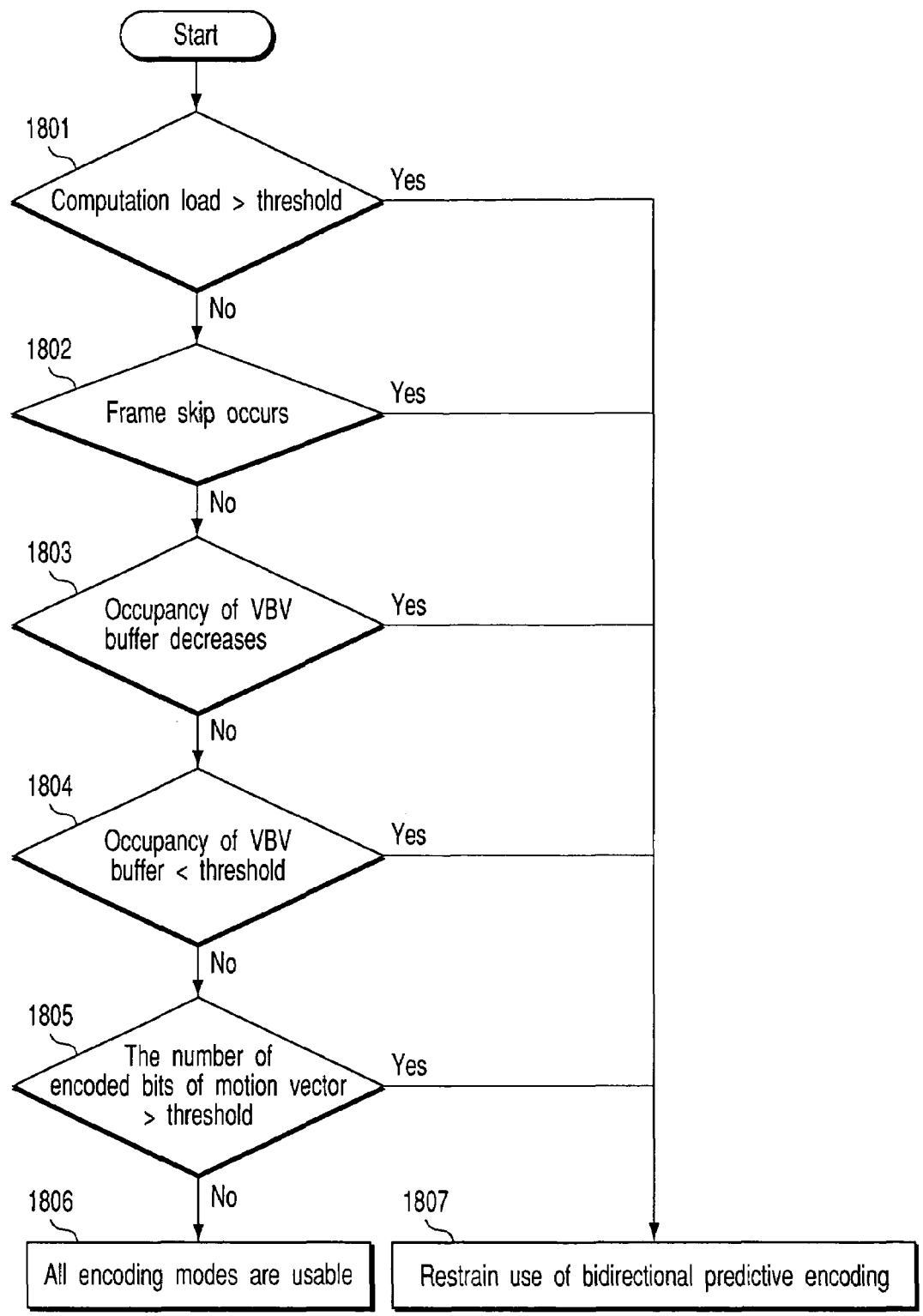
F I G. 13

VIDEO ENCODING APPARATUS AND METHOD AND VIDEO ENCODING MODE CONVERTING APPARATUS AND METHOD

CROSS-REFERENCE TO RELATED APPLICATIONS

This application is based upon and claims the benefit of priority from the prior Japanese Patent Applications No. 2002-280293, filed Sep. 26, 2002; and No. 2003-042078, filed Feb. 20, 2003, the entire contents of both of which are incorporated herein by reference.

BACKGROUND OF THE INVENTION

1. Field of the Invention

The present invention relates to a video encoding apparatus and method, and a video encoding mode converting apparatus and method.

2. Description of the Related Art

A MPEG-4 encoding scheme is a video encoding scheme making the applicable field broaden along with the popularization of Internet and a portable device.

The applicable field is not only confined to video communications between portable devices, but also applicable to various fields such as a streaming delivery delivering existing picture contents.

Particularly, in the streaming delivery, there are potentially various demands from a low bit rate such as several 10 kbps to superior quality delivery based on a high bit rate, according to the bandwidth of a network used for the streaming or request of a contents holder and an end user. In a high bit rate, the encoding scheme using a bidirectional prediction is used for encoding of VOP (Video Object Plane) similar to MPEG-4 Core Profile or Advanced Simple Profile. VOP represents a frame of a video, and corresponds to a frame or a field of MPEG-2.

There is a flag referred to as "not_coded" as an encoding parameter of a macroblock in MPEG-4. This indicates whether there is coded data (in particular, a quantizated DCT coefficient and a motion vector) concerning the macroblock. When this flag is "1", it indicates that the macroblock is processed as encoding unnecessity.

Generally, when to-be-encoded macroblock changes with respect to a reference VOP, that is, the motion vector obtained by motion vector detection is (0,0) and all the DCT coefficient after quantization are 0, "not_coded" flag is set to 1.

When a MPEG-4 decoder receives the macroblock which is "not_coded=1", the macroblock is decoded assume that all the DCT coefficients are 0 in the motion vector (0,0). Information of the macroblock that is at the same position as that of the reference picture is copied as it is.

In other words, this "not_coded" means "the same as a reference picture". More specifically, it means "encoding unnecessity" in encoding a video, and "copying from a reference picture" in decoding.

Whether the macroblock of a frame B-VOP is encoded depends on a value of the "not_coded" flag of the frame P-VOP encoded just before the frame B-VOP (the frame P-VOP which is just after the frame B-VOP in terms of time in an input sequence of the frame VOP).

When the "not_coded" flag is 1 in the macroblock at a certain position of the frame P-VOP, the macroblock of the frame B-VOP that is located at the same position as that of the frame P-VOP is skipped. When the frame B-VOP is decoded with a decoder, the information of the macroblock that is located at the same position as that of a reference frame is copied as it is.

In such a scheme, when only the frame B-VOP changes largely with respect to the reference VOP, an encoding error increases extremely. There is a flash picture as an example that such a phenomenon occurs.

When a flash lamp is lighted in a frame B-VOP between the frame I-VOP and frame P-VOP, the scene of the frame B-VOP becomes white in whole, resulting in decreasing correlation between the frame B-VOP and the reference VOP. However, since correlation between the frame I-VOP and frame P-VOP is high, a "not_coded" macroblock may be generated.

In such a time, when the "not_coded" macroblock is determined only by a motion detection result of the frame P-VOP, the phenomenon that a black block appears in the whole frame VOP that becomes white due to flash light occurs.

The encoded data generated by forward motion predictive coding and bidirectional motion predictive coding that are adopted in the MPEG-4 standard includes a motion vector for motion compensation and a DCT coefficient. In the case of the frame B-VOP and frame P-VOP, when correlation in the frames VOP and correlation with respect to the reference VOP are high, effective compressing is enabled.

However, when the correlation in the frames VOP and the correlation with respect to the reference frame VOP are small, a motion prediction misses the mark. As a result, the number of bits required for the motion vector increases in comparison with that required for the DCT coefficient. In particular, the frame B-VOP may spend about 2 times the number of bits required for the motion vector of the frame P-VOP.

As described above, whether a certain frame VOP is encoded by either of a frame B-VOP, frame P-VOP or frame I-VOP is determined according to the input sequence of the frame VOP. Therefore, it is encoded as the frame B-VOP under the situation that it is found that the motion prediction misses the mark. As a result, many bits are spent for the motion vector. For this reason, sufficient bits cannot be assigned for the DCT coefficients, resulting in deteriorating a picture quality.

BRIEF SUMMARY OF THE INVENTION

It is an object of the present invention to improve a picture quality of a frame B-VOP in the MPEG-4.

According to an aspect of the invention, there is provided A video encoding apparatus to encode a video, comprising: an input picture module configured to receive an input picture; a memory to store a reference picture; a motion vector detection module configured to detect a motion vector of the input picture in units of a macroblock by block matching referring to the reference picture; and a predictive encoding module configured to perform forward predictive encoding and bidirectional predictive encoding in units of a macroblock using the motion vector and the reference picture, to generate a forward predictive encoded picture and at least one bidirectional predictive encoded picture which is inputted between the forward predictive encoded picture and the reference picture, the predictive encoding module subjecting a macroblock of the forward predictive encoded picture to a variable length encoding in not_coded mode when a correlation between the macroblock of the forward predictive encoded picture and macroblocks of the bi-directional predictive encoded picture and the reference

BRIEF DESCRIPTION OF THE SEVERAL VIEWS OF THE DRAWING

FIG. 1 is a block diagram to explain a video encoding apparatus according to a first embodiment of the present invention.

FIG. 2 is a timing chart in MPEG-4 encoding apparatus according to the first embodiment of the present invention.

FIG. 8 shows a timing chart in a conventional MPEG-4 encoding apparatus.

FIG. 9 is a schematic diagram of a video encoding apparatus according to the third embodiment of the invention.

FIG. 10 is a diagram of explaining configuration of a video encoding apparatus according to the third embodiment.

FIG. 13 is a flowchart of explaining a determination process of controlling bidirectional predictive encoding.

DETAILED DESCRIPTION OF THE INVENTION

FIRST EMBODIMENT

Figure 3:
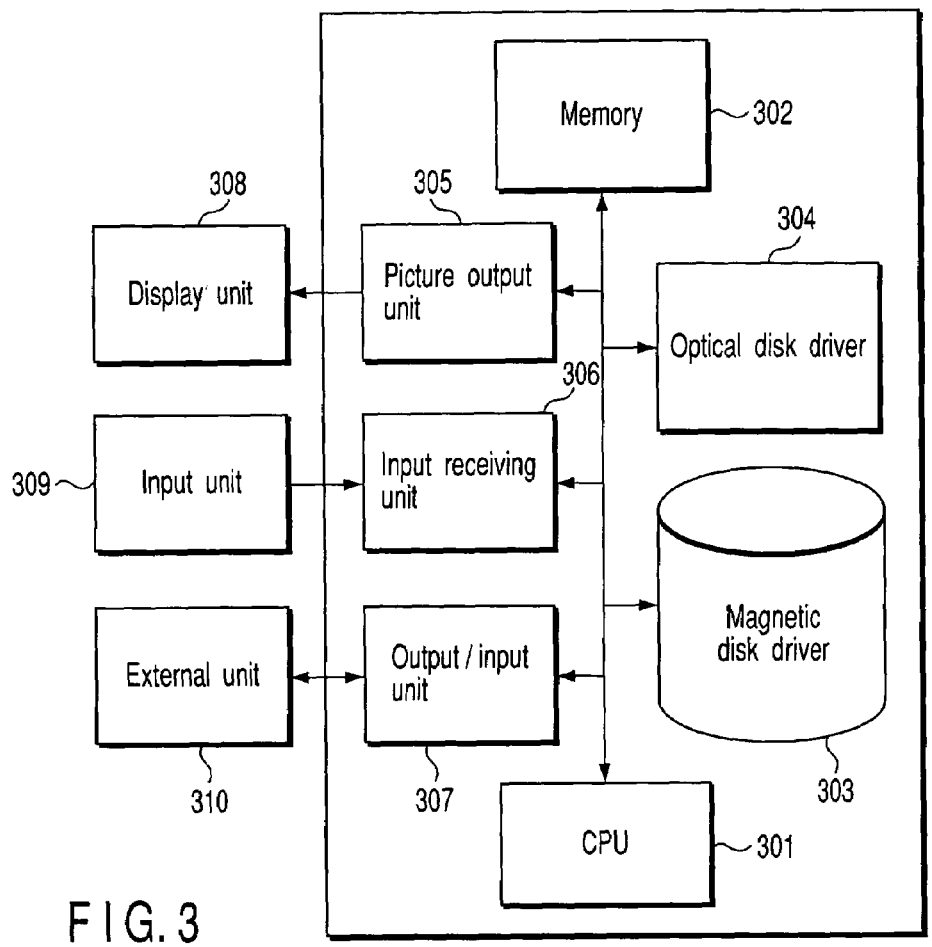
FIG. 3 shows an example of a personal computer or a work station to be used in the embodiment of the present invention.

There will now be described a video encoding apparatus of the first embodiment of the present invention referring to drawings.

In MPEG-4 encoding apparatus, each frame (VOP) of an input video is encoded by either of a frame I-VOP, a frame P-VOP and a frame B-VOP.

The frame I-VOP is a frame VOP intra-encoded without a motion detection. The frame P-VOP is a frame VOP obtained by a forward predictive encoding based on a forward motion detection, using a frame I-VOP or a frame P-VOP just before the to-be-encoded frame P-VOP in terms of time, that is, just before in an input sequence as a reference frame VOP. The frame B-VOP is a frame VOP obtained by a bidirectional predictive encoding based on a bidirectinal motion detection including both of forward and backward motion detections, using as a reference frame VOP the frames P-VOP (or frames I-VOP) just before and after the frame B-VOP.

In the MPEG-4 encoding scheme, each frame VOP of the video is not always encoded in an input sequence. For example, the frame B-VOP is encoded after the frames P-VOP just before and after the frame B-VOP in terms of time were encoded. Therefore, a timing chart of steps (input, forward motion detection, backward motion detection, DCT/quantization (Q factor)/inverse quantization (IQ)/IDCT/variable length coding (VLC)) of an encoding process is shown in FIG. 8, for example.

In FIG. 8, a time base is caught from left to right. In, frames Pn and Bn indicate frames VOP to be input n-th, respectively, and encoded as frames I-VOP, P-VOP and B-VOP.

According to FIG. 8, the frames VOP are input in an order of I0→P1-B2→B3→P4→B5→B6→P7, but a forward motion detection process is done in an order of P1→P4→B2→B3→P7→B5→B6 with delay of three frames VOP from the input frame. A backward motion detection process is done in an order of B2→B3→(no process)→B6→B5 with delay of five frames VOP from the frame input. The encoded data is output in an order of I0→P1-P4→B2→B3→P7→B5→B6 with delay of two frames VOP from the input.

A sequential flow of the encoding process is as follows:
(1) The frame I0 is input.
(2) The frame P1 is input.
(3) When the frame B2 is input, the frame I0 is encoded.
(4) When the frame B3 is input, the frame P1 is subjected to a forward motion detection process referring to the frame I0 and encoded.
(5) When the frame P4 is input, the frame P4 is subjected to a forward motion detection process referring to the frame P1 and encoded.
(6) When the frame B5 is input, the frame B2 is subjected to a forward motion detection process referring to the frame P1. The frame B2 is subjected to a backward motion detection process referring to the frame P4 and encoded.
(7) When the frame B6 is input, the frame B3 is subjected to a forward motion detection process referring to the frame P1. The frame B3 is subjected to a backward motion detection process referring to the frame P4 and encoded.
(8) When the frame P7 is input, the frame P7 is subjected to a forward motion detection process referring to the frame P4 and encoded.

Generally, in the MPEG-4 encoding, a to-be-encoded frame VOP is divided into a plurality of macroblocks and the encoding is repeated every macroblock. The size of macroblock is fixed in MPEG-4, but the size of macroblock may be variable in the present embodiment.

In encoding of the frame P-VOP as described above, if the macroblock of the frame P-VOP that is located at the same position as that of the reference frame VOP has extremely high correlation with respect to the reference macroblock of the reference frame VOP in the motion detection of the frame P-VOP, it is processed as "not_coded". If the macroblock of the frame P-VOP is "not_coded", the macroblock of the frame B-VOP using the same reference frame VOP as that used in the motion detection of the frame P-VOP is not coded.

Figure 7:
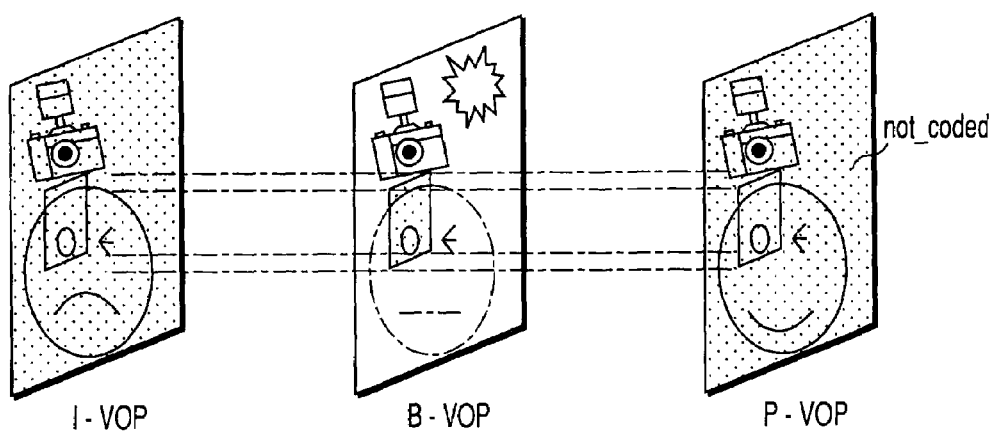
FIG. 7 is a diagram of explaining the state that "not_coded" macroblock has an effect on a picture quality.
Figure 6:
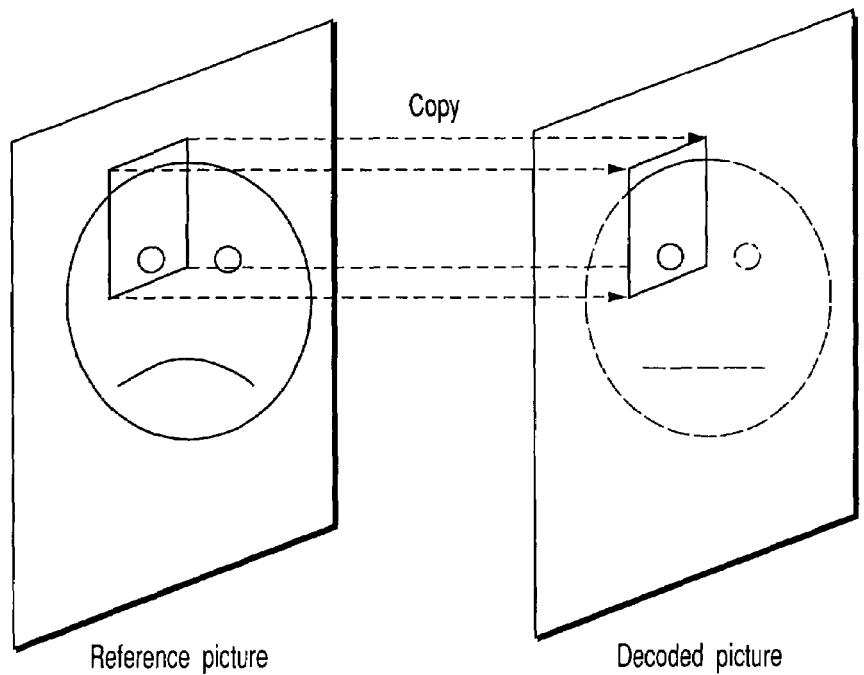
FIG. 6 is a diagram of explaining a decoding process of "not_coded" macroblock.

This macroblock of the frame B-VOP is copied with the macroblock of the reference frame VOP that is located at the same position as that of the frame B-VOP, at the time of decoding as shown in FIG. 6. Therefore, when only the frame B-VOP largely changes with respect to a video due to affection of the flash light as shown in FIG. 7, the video may be distorted.

This phenomenon will be described in an order of encoding and motion detection, using a timing chart of FIG. 8. The motion detection of the frame P4 is done referring to the frame P1. In the case that only the frame B2 largely changes with respect to the video due to affection of flash light, for example. It is assumed that the change of the frames P1 and P4 is small since the flash light is for a moment.

Further, assume that it is determined that correlation between a macroblock of the frame P1 and the macroblock of the frame P4 that is located at the same position as that of the frame P1 is extremely high, and the macroblock is "not_coded" or "skipped". Then, the macroblocks B2 and B3 that are located at the same position as the macroblock of the frame P4 are not encoded by the influence.

In this way, at the time of encoding of frame data, picture information of the macroblock of the picture P1 located at the same position as that of the frame P4 is copied to the macroblock of the frame P4. The image information is copied to the macroblocks B2 and B3 which are at the same position as that of the frame P4 from the macroblock of the frame P1 which is located at the same position as that of the frame P4. However, since affection of the flash light does not appear in the frame P1 at all, the picture of the frame B2 is distorted.

The following correlation is considered when encoding the frame P-VOP in the present embodiment to avoid such a picture distortion. In other words, there is considered the correlation between the macroblock of the reference frame VOP that is located at the same position as that of the frame P-VOP to be encoded and macroblocks of all frames B-VOP (that is, frames B-VOP inserted between the reference frame VOP and the frame P-VOP) which are subjected to a forward motion detection process using the same reference frame VOP as that used for the frame P-VOP, the macroblocks of the all frames B-VOP being located at the same position as that of the frame P-VOP.

When the macroblocks of the reference frame VOP, the frame P-VOP and all frames B-VOP therebetween, which are located at the same position, have high correlation, the macroblocks may not be encoded. In other words, the macroblocks are not encoded, that is, "not_coded".

When the frame P4 is encoded in FIG. 8, correlation between the frames P1 and B2 and correlation between the frames P1 and B3 as well as correlation between the frames P1 and P4 are considered. Only the macroblock that all correlations between the frames P1 and B2, the frames P1 and B3 and the frames P1 and P4 are high is processed as not_coded.

In this case, in the frame B-VOP that correlation between the macroblocks is obtained, it is desirable that the forward motion detection is finished beforehand. At the latest, it is desirable that forward motion detection finishes with respect to the macroblock which is located at the same position as the macroblock to be encoded by the frame P-VOP.

In the present embodiment to realize it, the encoding is done in a timing chart as shown in FIG. 2, for example. Then, the motion detection of the frames B2 and B3 is completed in encoding the frame P4 and the encoding of the frames B2 and B3 is done referring to the forward motion detection results of the frames B2 and B3. FIG. 2 shows an example of a timing chart in case of two frames B-VOP between the frames P-VOP or between the frame I-VOP and frame P-VOP.

(Configuration of an Apparatus)

FIG. 1 is a block diagram showing the configuration of a MPEG-4 encoding apparatus according to the first embodiment of the present invention. The encoding apparatus of the present embodiment comprises a frame memory 1 to store input pictures in units of a frame VOP sequentially, a motion detection unit 2 to detect a motion vector, and a SAD (Sum Of Difference) memory 3 to store a matching error (matching residual) corresponding to a motion vector.

Further, it includes a motion vector memory 8 to store a motion vector, a motion compensator 9 which determines an encoding mode of a frame (intra frame encoding, forward prediction encoding, bidirectional predictive coding) at an input sequence of a frame and performs a motion compensation according to each mode, a frame memory 10 to store a local decoded picture in units of a frame VOP, a discrete cosine transformer 6 to subject a motion compensated picture to a discrete cosine transform, a quantizer 5 to quantize a DCT coefficient, and a variable length encoder 4 to generate encoded data from a quantizaed DCT coefficient and a motion vector.

Further, it comprises an inverse quantizer 12 and an inverse discrete cosine transformer 11 by which a local decoded picture is generated, an adder 13, a subtracter 14, and a mode determination unit 7 that determines whether the encoding mode of macroblock should be a "not_coded" mode.

It differs from a conventional MPEG-4 encoding apparatus that the present encoding apparatus provides with the SAD memory 3, the motion vector memory 8 and the mode determination unit 7.

This present apparatus is realized as a program to be executed by a personal computer (PC) or a work station (WS) which provides with an image reader such as a camera as an external unit. However, it may be realized by hardware such as a semiconductor integrated circuit.

FIG. 3 is an example of the PC or WS to execute the program of the present embodiment. The PC or WS used in the present embodiment comprises a display unit 308 such as CRT or LCD, an input unit 309 such as a keyboard or mouse, and an external unit 310 such as a digital camera.

The PC or WS used in the present embodiment provides with an image output unit 305 to output a picture signal to the display unit 308, an input receiving unit 306 to receive a signal from the input unit 309, and an output/input unit 307 corresponding to an interface (for example, USB, a parallel-serial port, a communications unit) to exchange a signal with the external unit 310.

The PC or WS used in the present embodiment comprises a CPU 301 to execute a program code, a memory 302 to store data and the program code, a magnetic disk drive 303 to store data and a program, and an optical disk drive 304 to read information recorded in optical media such as CD-ROM or DVD-ROM.

The program of the present embodiment is stored in the disk drive 303, read out in response to the execution request from a user, expand to the memory 302, and executed with the CPU 301. An execution result is stored in the memory 302 and stored in the disk drive 303 as needed or output to the external unit 310 via the output/input unit 307 according to a demand of the user.

(Summary of Operation)

The MPEG-4 encoding apparatus of the present embodiment encodes an input video and outputs encoded data as executed by a conventional MPEG-4 encoding apparatus.

The input video is stored in the frame memory 1 and rearranged from an input sequence to an encoding sequence. The motion detector 2 detects the motion of a to-be-encoded frame VOP output from the frame memory 1 by using the frame I-VOP or P-VOP stored in the frame memory 10 as the reference frame VOP for each macroblock of the to-be-encoded frame VOP.

When a motion vector is obtained by the motion detection, the motion compensator 9 extracts data of a rectangular area corresponding to the macroblock of the reference frame VOP indicated by the motion vector. The subtracter 14 calculates a difference between the to-be-encoded macroblock and the rectangular area data. The difference data is converted into a DCT coefficient with the DCT unit 6, quantized with the quantizer 5 and subjected to run-length encoding/variable length encoding with the variable length encoder 4 to generate a 4 MPEG-4 bit stream.

When the frame VOP to be encoded is a frame I-VOP or P-VOP, the DCT coefficient after quantization of each macroblock is dequantized with the inverse quantizer 12 and converted into difference data with respect to the motion compensated frame with the inverse DCT unit 11. When the difference data and data of a rectangular area corresponding to a macroblock output from the motion compensation unit 9 are added with the adder 13, each macroblock becomes picture information.

A picture obtained by arranging these macroblocks in a given order is a local decoded picture. The local decoded picture is accumulated in the frame memory 10, and used as a reference frame VOP for motion detection and motion compensation.

(Forward Motion Detection)

Since the backward motion detection is similar to a conventional MPEG-4 decoder, its detail is omitted. The forward motion detection process is described hereinafter.

The motion detector 2 refers to data of a frame Ref (x, y) which is a reference frame VOP stored in the frame memory 1 and corresponding to the frame I or P-VOP encoded just before a to-be-encoded frame and a frame Cur which is the to-be-encoded frame VOP to be encoded as a frame B or P-VOP (x, y are parameters of a coordinate in the frame VOP).

The frame VOP in a time t is expressed with fr(t). In the case of the forward motion detection, the reference frame VOP is input ahead of the current frame VOP. Therefore, when Ref (x, y) is assumed to be a frame VOP of a time t0, Cur (x, y) is a frame VOP of the time t0+i. Thus, Ref (x, y) can be expressed as fr (t0), and Cur (x, y) as fr(t0+i).

The motion detector 2 performs the forward motion detection by using these frames VOP. The order of the forward motion detection of the present embodiment is assumed to be identical with an input sequence of the frames VOP as shown in FIG. 2.

In other words, the motion detection is executed according to the following algorithm:

for i=1 to M
begin
MotionEstimation(fr(t0+I),fr(t0))
end
MotionEstimation (x, y) is a function for performing the motion detection of the frame VOPx using the frame VOPy as a reference frame VOP.

The motion detection of each macroblock of the current frame VOP is realized using MV0 (h, v)=(MVh, MVv) according to the following equation:

$$SAD(j, k) = \left( \sum_{l=0}^{15} \sum_{m=0}^{15} |\text{Re}f(h \cdot 16 + MVh + j + l, \right.$$
$$\left. v \cdot 16 + MVv + k + m) - Cur(h \cdot 16 + l, v \cdot 16 + m)| \right)$$

SAD min=min (SAD(j, k))

$-N \leq j \triangleleft N, -N \leq k \triangleleft N$

In equation 2, since (j, k) when SADmin is obtained represents a motion vector of the macroblock, this is stored in a motion vector memory 8 and SADmin is stored in the SAD memory 3. SADmin is a quantity corresponding to a matching error because a motion vector search is done by block matching of the macroblock.

In the present embodiment, the order of the forward motion detection is identical to the input sequence of the frame VOP. However, if the motion detection of the frame B-VOP using as a forward motion reference frame VOP the frame VOP referred to in the forward motion detection of a frame P-VOP in encoding the same is completed, the forward motion detection may not be the above order.

(Motion Compensation)

The motion compensator 9 performs motion compensation using the motion vector provided from the motion vector memory 8 and the local decoded picture of the reference frame VOP read from the frame memory 10.

Concretely, the subtracter 14 subtracts picture data of a rectangular area corresponding to the macroblock of the reference frame VOP indicated by a motion vector from each macroblock of the to-be-encoded picture read from the frame memory 1, thereby to obtain a prediction error.

The prediction error is passed through the DCT unit 6 and the quantizers 5, resulting in reducing an amount of informaiton. The DCT coefficient after quantization is input into the mode determination unit 7 and converted into encoded data with the variable length encoder 4. The local decoded picture is made through the inverse quantizer 12, the inverse discrete cosine transformer 11 and the adder 13, and stored in the frame memory 10.

(Encoding Mode Determination/Encoding of Macroblock)

The mode determination unit 7 determines whether the macroblock should be processed by "not_coded" in a procedure to be described below. The variable length encoder 4 generates a code corresponding to the mode according to a determination result of the mode determination unit 7 and output it as a MPEG-4 bit stream.

Figure 4:
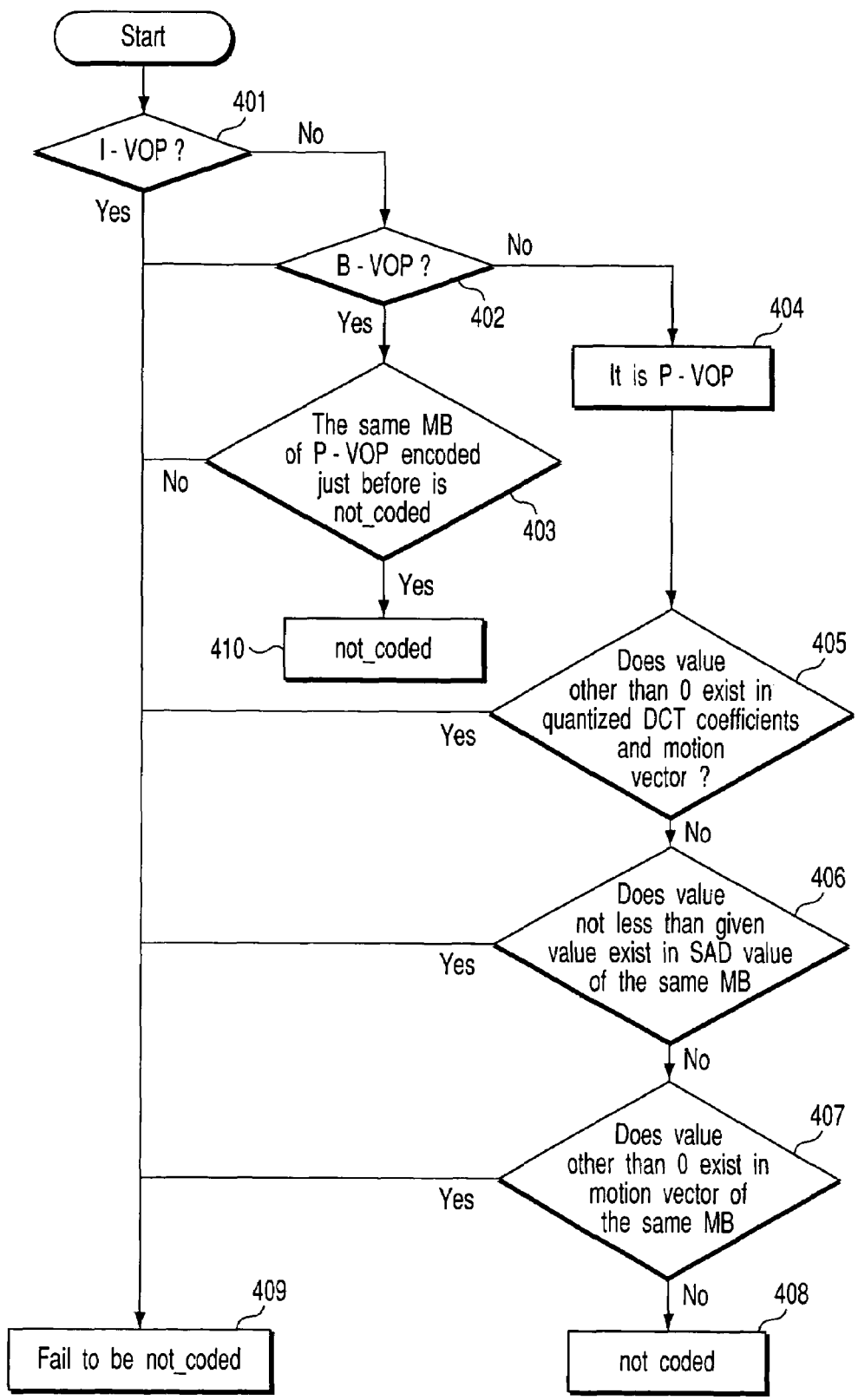
FIG. 4 is a flow chart explaining an encoding mode determination procedure in the first embodiment of the present invention.

A procedure that the mode determination unit 7 determines an encoding mode every macroblock is shown in FIG. 4.

It is examined whether the currently encoding frame VOP is a frame I-VOP. If it is the frame I-VOP, the macroblock to be determined tails to be "not_coded" (Step 401).

It is examined whether the currently encoding frame VOP is a frame B-VOP (Step 402). If it is the frame B-VOP, it is examined whether the macroblock of the frame P-VOP encoded just before the frame B-VOP, which is located at the same position as that of the frame VOP, is "not_coded". Assuming the macroblock of the same position is "not_coded", the macroblock to be determined is assumed to be "not_coded". If the macroblock of the same position fails to be "not_coded", the macroblock to be determined fails to be "not_coded" (Step 403).

Since the currently encoding frame VOP is a frame P-VOP, if either of conditions (A), (B) and (C) is satisfied, the macroblock fails to be "not-coded" (Step 404).

(A) A coefficient aside from 0 is included in a DCT coefficient after quantization of the macroblock to be determined and a forward motion vector.

(B) In the frame VOP subjected to the forward motion detection using the same reference frame VOP, that is, fr(t1−i) (i=1 . . . M−1), a size of a motion vector detected in the macroblock that is located at the same position as the currently encoding macroblock is larger than 0.

(C) In the frame VOP subjected to the motion detection using the same reference frame VOP, a value larger than a threhold T is included in a SAD value concerning the macroblock that is located at the same position as the currently encoding macroblock.

If the quantization coefficient of the current macroblock assumes q, the threshold of the condition (C) is expressed as follows:

$$T = q \times r$$

where the coefficient r is expressed as follows:

$$r = c \times \frac{\overline{QB}}{\overline{Qp}}$$

QB is average of quantization coefficients of the frame B-VOP just before the current frame.

QP is average of quantization coefficients of the frame P-VOP just before the current frame.

c is a constant

According to the above-mentioned determination procedure, the condition that the macroblock in the frame P-VOP is encoded in not_coded mode is to satisfy all of the following three conditions:

(α) All DCT coefficients after quantization of the macroblock and a motion vector are 0.

(β) The detected motion vectors of the macroblocks that are located at the same position as that of the reference frame in all frames B-VOP subjected to the forward motion detection using the same reference frame VOP are 0.

(γ) The detected SAD value of the macroblocks that are located at the same position as that of the reference frame in all frames B-VOP subjected to the forward motion detection using the same reference frame VOP is less than a threshold T.

The condition (γ) is a condition that "Change of the macroblock is small". In other wards, it is a condition for guaranteeing that the macroblock is not largely changed only for a moment by flash light.

On the contrary, the macroblock in the frame P-VOP that neither of the conditions (α) to (γ) is satisfied is subjected to a normal encoding process.

The condition that the macroblock in the frame B-VOP is encoded in not_coded mode is similar to the prior art. In other words, the macroblock located at the same position as that of the reference frame in the frame P-VOP subjected to the forward motion detection using the same reference frame VOP is encoded in not_coded mode.

(Order of Frames to be Encoded)

FIG. 2 is a timing chart expressing the order of encoding processes in the present embodiment.

FIG. 2 shows a time base from the left to the right similarly to FIG. 8. In, Pn and Bn indicate frames VOP to be input n-th, respectively, and encoded as frames I-VOP, P-VOP and B-VOP.

In the present embodiment, when video frames VOP are input in the order of I0→P1→B2→B3→P4→B5→B6→P7 . . . , the forward motion detection process is done in the order of P1→B2→B3→P4→B5→B6→P7 . . . with a delay of one frame VOP from the input. The backward motion detection is done in the order of B3→B2→(no process)→B6→B5 . . . with a delay of 4 frames VOP from the input. The encoded data which is finally encoded is output in the order of I0→P1→P4→B2→B3→P7→B5→B6 with a delay of two frames VOP.

A flow of a sequence of an encoding process is described as follows:

(1) The frame I0 is input.

(2) When the frame P1 is received, the frame P1 is subjected to the forward motion detection process referring to the frame I0.

(3) When the frame B2 is received, the frame B2 is subjected to the forward motion detection process referring to the frame P1. The frame I0 is encoded.

(4) When the frame B3 is received, the frame B3 is subjected to the forward motion detection process referring to the frame P1. The frame P1 is encoded as a forward motion compensated frame using the frame I0.

(5) When the frame P4 is received, the frame P4 is subjected to the forward motion detection process referring to the frame P1. The frame B3 is subjected to the backward motion detection process referring to the frame P4. The frame P4 is encoded using the frame P1 as a forward motion compensated frame.

(6) When the frame B5 is received, the frame B5 is subjected to the forward motion detection process referring to the frame P4. The frame B2 is subjected to the backward motion detection process referring to the frame P4. The frame B2 is encoded using the frame P1 as the forward motion compensated frame, and using the frame P4 as the backward motion compensated frame.

(7) When the frame B6 is received, the frame B6 is subjected to the forward motion detection process referring to the frame P4. The frame B3 is encoded using the frame P1 as the forward motion compensated frame, and using the frame P4 as the backward motion compensated frame.

(8) When the frame P7 is received, the frame P7 is subjected to the forward motion detection process referring to the frame P4. The frame P7 is encoded using the frame P4 as the forward motion compensated frame.

The order of the forward motion detection and the order of the encoding process are identical in the prior art. In the present embodiment, since the forward motion detection and the encoding process are done in an input sequence, the result of the forward motion detection can be taken into consideration by referring to the same frame VOP as the frame P-VOP at the time of encoding of the frame P-VOP.

When a telescopic search is applied to the forward motion detection to reduce an operation quantity for the motion detection, the order of motion detection may take such a sequence. Therefore, the present invention and the telescopic search can be used simultaneously.

The forward motion detection using the telescopic search is a method of detecting a motion vector by reading from the motion vector memory 8 a motion vector MV0 (h, v) detected from the frame VOP using the same reference frame VOP just before the frame VOP, and block-matching −N to N−1 pixels horizontally and vertically as an offset value of a search proximal point.

In the present embodiment, the such order of motion detection is not for reduction of operating quantity (speedup), but for restraint of picture degradation (improvement of picture quality). This point is different from the prior art. Generally, the processing speed and the picture quality contradict in demand to each other.

The present embodiment can attain improvement of picture quality by using a measure common to improvement of process speed. Therefore, improvement of both of the process speed and picture quality can be realized.

(Effect of the Present Embodiment)

According to the present embodiment as described above, when deciding an encoding mode of each macroblock of the frame P-VOP, the forward motion detection result on the frame B-VOP subjecting to the forward motion detection referring to the same frame VOP as the frame P-VOP is taken into consideration. Therefore, even if sudden mutation occurs to the picture by merely the frame B-VOP, degradation of the picture can be restrained.

It becomes easy to reduce a computing quantity to need to the motion detection by applying a telescopic search to the forward motion detection of the frame B-VOP referring to the same frame VOP, before the forward motion detection of the frame P-VOP.

SECOND EMBODIMENT

The second embodiment of the present invention will be described referring to the drawings hereinafter.

(Configuration of the Apparatus)

Figure 5:
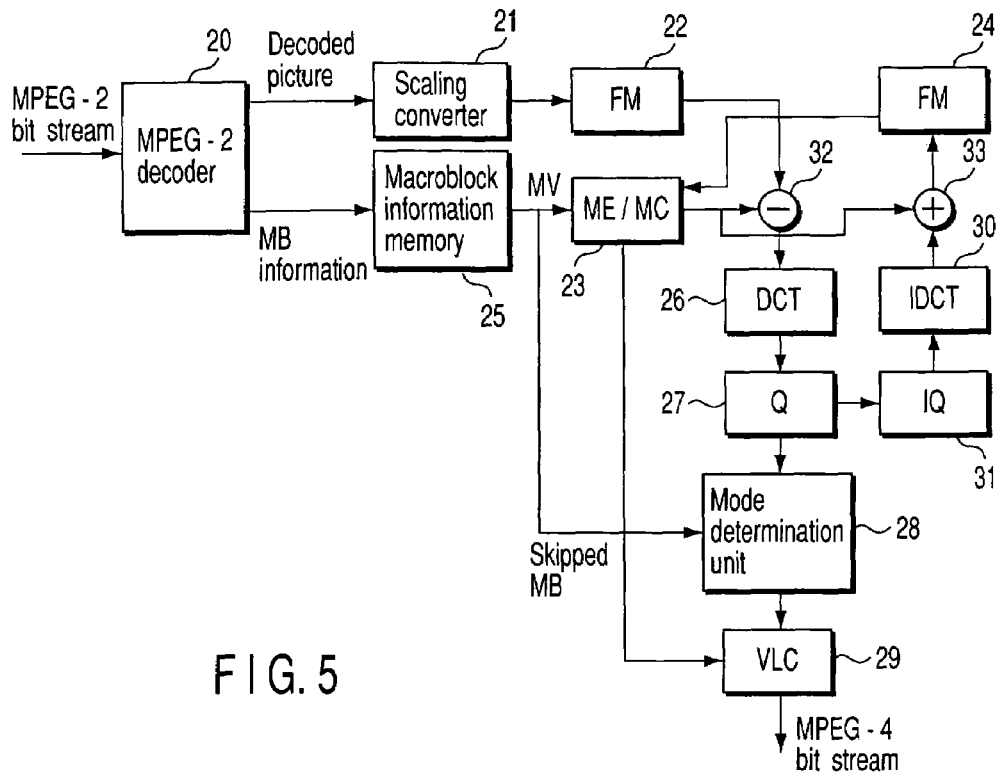
FIG. 5 is a block diagram to explain a picture encoding apparatus according to the second embodiment of the present invention.

FIG. 5 is a block diagram which shows configuration of a picture conversion apparatus relative to the second embodiment of the present invention from MPEG-2 to MPEG-4.

The conversion apparatus of the present embodiment comprises a MPEG-2 decoder which decodes data of a MPEG-2 scheme to generate a video, a scaling transformer 21 which transforms resolution, a macroblock information memory 25 which stores sequentially information such as a motion vector and an encoding mode of the macroblock which are provided from a MPEG-2 decoder 20, and a frame memory 22 which stores the resolution-transformed video in units of one frame.

Further, the present apparatus has a configuration for MPEG-4 encoding, that is, comprises a motion detection and motion compensation unit 23 for motion detection and motion compensation, a discrete cosine transformer 26, a quantizer 27, a mode determination unit 28 to determine an appropriate encoding mode every macroblock, and a variable length encoder 29 to generates a MPEG-4 encoded bit stream.

The present apparatus comprises an inverse quantizer 31, an inverse discrete cosine transformer 30, a frame memory 24 to store local decoded pictures in units of a frame VOP, sequentially, an adder 33 and a subtracter 32, to generate a local decoded picture used for motion compensation and motion detection in MPEG-4 encoding.

The present apparatus is used for generating from a MPEG-2 bit stream a bit stream of MPEG-4 with the same frame rate as the MPEG-2 bit stream and a bit rate reduced by lowering resolution. The MPEG-4 conversion apparatus of the present embodiment is realized as a program executed by a personal computer (PC) and a work station (WS) including a measure to input a MPEG-2 bit stream and constructed similarly to the first embodiment. However, it may be realized by hardware wherein each part of the converter is formed on a semiconductor integrated circuit.

The following description assumes that an input MPEG-2 bit stream has a resolution of 720×480 pixels and a generated MPEG-4 bit stream has a resolution of 352×240 pixels.

(Operation)

The MPEG-2 bit stream input into this apparatus is decoded with the MPEG-2 decoder 20 to generate a picture. Simultaneously with this, information of each macroblock of each frame encoded by MPEG-2 at the same time, particularly motion vector and skipped MB are generated. The information of these macroblocks is accumulated in the macroblock information memory 25.

On the other hand, the decoded picture having resolution of 720×480 pixels is reduced to 352×240 pixels with the scaling transformer 21 and then stored in the frame memory 22. The scaling transformation is carried out by reducing the input picture horizontally and vertically to 360×240 pixels indication half resolution of the input image and then cutting right eight pixels of the picture.

The motion detection/motion compensation unit 23 receives the picture stored in the frame memory 22 as the picture to be subjected to the motion compensation and motion detection, and the MPEG-4 local decoded picture stored in the frame memory 24 as a reference picture frame VOP to perform the motion detection and motion compensation. The motion detection is performed referring to the motion vector used in MPEG-2 from the macroblock information memory 25, so that a computed amount is largely reduced.

In the case that the motion detection is performed with respect to the macroblock MB4 (h, v) of a certain frame VOP of MPEG-4, there are four kinds of macroblocks in the MPEG-2 macroblock MB2 (x, y) including the same picture as the macroblock MB4 (h, v), that is, MB2 (2h, 2v), MB2 (2h+1, 2v), MB2 (2h, 2v+1) and MB2 (2h+1, 2v+1).

Therefore, the vector obtained by scaling a motion vector of the above four macroblocks to ½ is assumed as a candidate of a motion vector of MB4 (h, v).

Since the motion vector of MPEG-2 has grading of ½ pixel precision, if the motion vector is scaled, the motion vector has grading of ¼ pixel precision. It is possible to obtain a motion vector by using these four motion vectors as search candidate vectors and performing the motion detection in the range of ±0.5 pixels horizontally and vertically with respect to the candidate vector.

It is similar to a conventional MPEG-4 encoding apparatus to do motion compensation based on the motion vector obtained as above, and further perform DCT and quantization. It is similar to a conventional MPEG-4 encoding apparatus to generate a local decoded picture by subjecting the DCT and quantized picture to dequantization and inverse DCT when the picture is a frame I-VOP or P-VOP.

When the to-be-encoded picture is a frame P-VOP, the mode determination unit 28 determines whethere or not each macroblock contained in the to-be-encoded picture should be skipped based on the MPEG-2 macroblock information stored in the macroblock information memory 25.

Assuming that a P-picture of MPEG-2 corresponding to the frame P-VOP belonging to the macroblock MB4 (h, v) to be encoded is represented by pic(t), and the picture referring to the picture pic(t) as a forward motion compensation picture is represented by pic (t−M) (M>0). In this case, if all of the following conditions are satisfied, the macroblock MB4 (h, v) is determined as "skipped".

(1) MB 2 (2h, 2v), MB 2 (2h+1, 2v), MB 2 (2h, 2v+1) and MB 2 (2h+1, 2v+1) all are skipped macroblocks.

(2) In all B-pictures referring to pic (t−M) as a forward motion compensated picture, namely pic (t−M+1) . . . pic (t−1), the macroblock that is located at the same position as MB2(2h, 2v), MB 2(2h+1, 2v), MB2(2h, 2v+1) and MB2 (2h+1, 2v+1) is the skipped macroblock or the motion vector is 0, and CBP (Coded Block Pattern: parameters expressing the number and position of the changed blocks in six blocks included in the macroblock, called "significant block pattern") S of an encoded parameter is 0.

When the macroblock MB4 (h, v) is determined as "not_coded", the mode determination unit 28 controls the variable length encoder 29 to set a "not_coded" flag on MPEG-4 with respect to the macroblock MB4 (h, v) to 1.

In a P-picture of MPEG-2, the motion vector of the skipped macroblock is (0,0). However, in a B-picture of MPEG-2, the motion vector of the skipped macroblock means to use the same motion vector as the left side macroblock and is not always to be (0,0).

However, since each macroblock of a P-picture referring to the same picture has a (0, 0) motion vector, the motion vector of the skipped macroblock of the B-picture may be (0, 0).

The macroblock which is not determined as "not coded" is subjected to an encoding process as a normal frame P-VOP.

Even if all frames B-VOP existing between the frame P-VOP and the reference frame VOP as well as the frame P-VOP are processed by "not_coded", no problem is confirmed by the above determination similarly to the first embodiment.

According to the present embodiment as described above, when the video wherein a large change occurs only to the B-picture for an instant and which includes a skipped and encoded macroblock in a P-picture just after the B-picture is converted from a MPEG-2 bit stream to a MPEG-4 bit stream, distortion of the video can be restrained.

The above first and second embodiments are described for an example of MPEG-4. However, the present invention is not limited to MPEG-4.

The present invention may be applied to an encoding system for encoding each picture of the video using correlation in the picture and correlation between pictures, the encoding mode every macroblock of a frame B-VOP of MPEG-4 being depend upon the encode mode of the frame P-VOP just after the frame B-VOP.

THIRD EMBODIMENT

A third embodiment of the present invention will now be described with reference to drawings.

The MPEG-4 encoding apparatus of the present embodiment will be described referring to FIG. 9. The MPEG-4 encoding apparatus of the present embodiment is a program executed with a computer. In other words, it is realized as a program to make a computer to execute a function of each part to explain from now on.

The video encoding apparatus of the present embodiment includes a video encoding module 1401 to encode a video, a computation load measurement module 1402 to examine computation load on an encoding process, and an encoding mode control module 1403 to control an encoding mode of each frame VOP of video.

The video encoding module 1401 encodes each frame VOP of an input video by an encoding mode of either of intra frame encoding, forward predictive encoding and bidirectional predictive encoding to output encoded data. Information concerning encoding is output to the encoding mode control module 1403. The information concerning encoding includes the number of encoded bits and information of the encoding mode used last.

The computation load measurement module 1402 examines a computation load of the encoding process, and notifies it to the encoding mode control module 1403. Since this apparatus is a program to be executed with a computer, load of the central processing unit 301 (FIG. 3) loaded on the computer is examined and notified to the encoding mode module 1403.

The encoding mode control module 1403 determines an encoding mode of each frame of video and controls the video encoding module 1401 based on information concerning encoding from the video encoding module 1401.

The encoding mode control module 1403 determines whether bidirectional predictive coding is efficiently executed. When the encoding mode control module 1403 determines no good efficiency, it controls the video encoding module 1401 to restrain the use of bidirectional predictive encoding, and to use the forward predictive encoding.

In the present embodiment, when the bidirectional predictive encoding must be used due to an order of frames to be encoded, it is used. Thus, "use restraint" is performed. Assuming that there are frames VOP of P1→B2→B3→P4→B5→B6→P7. When it is determined that encoding of the frame B2 brings no good efficiency, the forward predictive encoding of the frame B3 fails. In such case, the frame B3 is encoded as a frame B-VOP and use of the bidirectional predictive encoding on and after the frame B5 is stopped.

"Use prohibition" may be done. In the case of "use prohibition", the encoded frame VOP is encoded again as needed. In the above example, when it is determined that encoding of the frame B2 brings no good efficiency, the frame B3 is forcibly subjected to the forward predictive encoding. Also, the frame P4 is encoded again, because the reference frame VOP must be changed to the frame B3.

Even if the computation load is higher than a threshold, the encoding mode control module 1403 controls the video encoding module 1401 so as to restrain the bidirectional predictive encoding.

The MPEG-4 encoding apparatus of the present embodiment may be realized as hardware of monolithic IC and the like.

FIG. 10 is a schematic diagram of the MPEG-4 encoding apparatus of the present embodiment. The encoding apparatus of the present embodiment comprises a frame memory 1501 to store input pictures in units of a frame VOP sequentially, a motion detector 1502 to determine an encoding mode (intra frame encoding, forward predictive encoding, bidirectional predictive encoding) of each frame VOP and detect a motion vector, and a variable length encoder 1509 to generate MV coded data from motion vectors.

Further, the encoding apparatus provides with a motion compensator 1504 to perform motion compensation according to an encoding mode of each frame VOP and a frame memory 1503 to store a local decoded picture in units of a frame VOP.

Further, there are provided a discrete cosine transformer 1505 to subject the motion compensated picture to DCT, a quantizer 1506 to quantize a DCT coefficient, a variable length encoder 1510 to generate DCT encoded data from quantized DCT coefficients, an inverse quantizer 1507 and inverse discrete cosine transformer 1508 for generation of a local decoded picture, an adder 1516, and a subtracter 1515.

Further, there are provided a multiplexer 1511 to multiplex the DCT coded data and the MV coded data to generate a bit stream, an output bit counter 1512 to measure the number of encoded bits of the bit stream and the number of encoded bits of a motion vector, and a rate controller 1513 to control a quantization scale of the quantizer 1506 according to the measured number of encoded bits. The above configuration corresponds to the video encoding module 1401 of FIG. 9.

The encoding apparatus of the present embodiment includes a computation load measurement unit 1517 to measure the computation load of the encoding process. This is a part corresponding to the computation load measurement module 1402 of FIG. 9.

The encoding apparatus includes an encoding mode controller 1514 according to the number of encoded bits measured with an output bit counter 1512, the number of encoded bits of a motion vector origin and the computation load measured with the computation load measurement region 1517 to control a motion detection mode (forward prediction, bidirectional prediction and non-prediction) in a motion detector 1502 and an encoding mode (forward predictive encoding, bidirectional predictive encoding, a intra-frame encoding) in the variable length encoder 1509. This is a part corresponding to the encoding mode control module 1403 of FIG. 9.

(Operation)

The to-be-encoded video is stored every frame VOP in the frame memory 1501 sequentially. The motion detector 1502 determines an encoding mode of each frame VOP and reads a frame VOP to be encoded from the frame memory 1501. A motion vector is derived in units of a block by the motion detection with reference to a frame VOP to be encoded as frames P-VOP and B-VOP.

The variable length encoder 1509 obtains a difference between a motion vector of each block and a motion vector of a block neighboring to the block and subjects the difference to a variable length encoding to generate MV coded data.

Figure 11A:
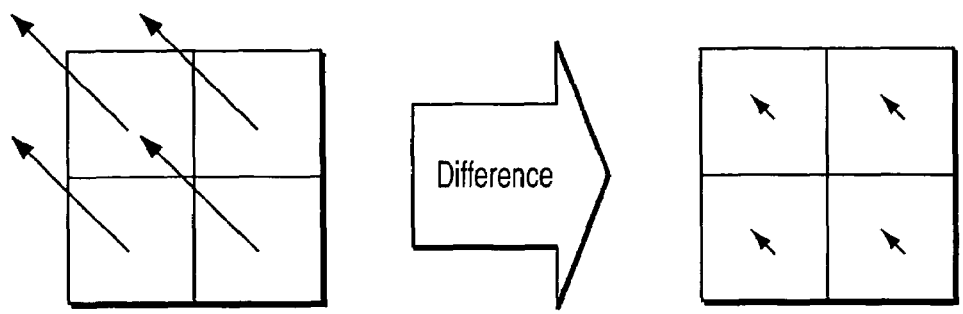
FIG. 11A shows an example that a motion vector can be effectively compressed.
Figure 11B:
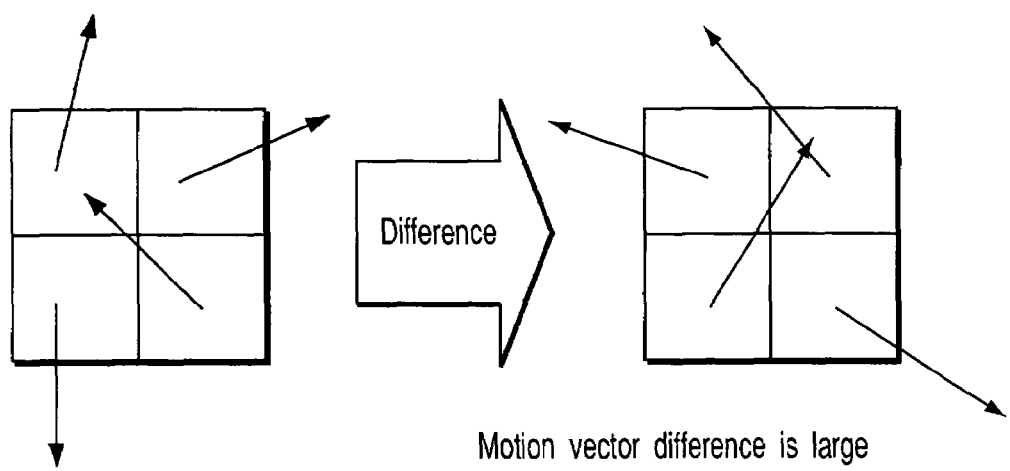
FIG. 11B shows an example that a motion vector cannot be effectively compressed.

When a motion vector similar to that of a peripheral block is detected, the difference becomes about 0. The motion vector can be compressed very effectively by the variable length encoding (FIG. 11A). On the other hand, when correlation with respect to the peripheral motion vector is low, the difference increases. As a result, the number of encoded bits when the motion vector is subjected to the variable length encoding increases, resulting in lowering a compression effect of encoding (FIG. 11B).

The case that a motion vector similar to that of the peripheral block is detected represents, generally, a scene where a movement prediction hits, that is, a scene that correlation between the reference frame VOP and the to-be-encoded frame VOP is high. On the other hand, the case that correlation with respect to the peripheral motion vector is low represents, generally, a scene where the movement prediction does not hit, that is, a scene that correlation between the reference frame VOP and the to-be-encoded frame VOP is low.

The motion compensator 1504 performs motion compensation using a motion vector provided with the motion detector 1502 and a reference frame VOP read from the frame memory 1503. The subtracter 1515 subtracts picture data of the rectangular area corresponding to the macroblock of the reference frame VOP indicated by a motion vector from each macroblock of the to-be-encoded frame VOP read from frame memory 1501 to obtain a prediction error.

The prediction error passes through the discrete cosine transformer 1505 and the quantizer 1506, resulting in decreasing an information amount. The DCT coefficient after quantization is subjected to a variable length encoding with the variable length encoder 1510 to be converted into DCT encoded data.

The multiplexer 1511 multiplexes the DCT encoded data and the MV encoded data to output a bit stream. The DCT encoded data is output to the inverse quantizer 1507, and converted into a local decoded picture through the inverse discrete cosine transformer 1508 and adder 1516 and stored in the frame memory 1503.

When encoding a video by the MPEG-4 standard, it is necessary to consider occupancy of a virtual buffer corresponding to an input buffer of the decoding apparatus so that the input buffer of the decoding apparatus does not overflow or underflow.

The output bit counter 1512 measures the number of encoded bits of each frame VOP output from the multiplexer 1511 to estimate a buffer occupancy. This buffer is referred to as a VBV (Video Buffering Verifier) buffer. The details about the VBV buffer are described below. The output bit counter 1512 measures the number of encoded bits of a motion vector origin of each frame VOP.

The output bit counter 1512 notifies the quantization rate controller 1513 and encoding mode controller 1514 of the estimated occupancy of the VBV buffer. The output bit counter 1512 notifies the encoding mode controller 1514 of the number of encoded bits of the motion vector origin of each frame VOP.

The quantization rate controller 1513 controls a quantization scale used in the quantizer 1506 according to the occupancy of the VBV buffer to adjust the number of encoded bits. The details are described below.

The computation load measurement unit 1517 measures computation load in the encoding process and notifies the encoding mode controller 1514 of the quantity of the load.

The encoding mode controller 1514 determines whether use of bidirectional predictive encoding should be restrained according to the quantity of the load, the occupancy of the VBV buffer and the number of encoded bits of the motion vector origin, and controls the motion detector 1502 and the variable length encoder 1509. The details about the encoding mode controller 1514 are described below.

(VBV Buffer)

The VBV buffer is a virtual buffer which assumes the buffer of the decoding apparatus side. The occupancy of the VBV buffer is always increased at a given speed in correspondence with the bit rate at which the encoded data is input to the decoding apparatus. The data in the buffer decreases as the decoding apparatus decodes the encoded data. In correspondence with this the occupancy of VBV buffer decreases at every constant time.

The timing at which the occupancy of the VBV buffer should be decreased is set to the timing at which the encoded data of one frame VOP is output from the apparatus. The occupancy of the VBV buffer decreases to the number of encoded bits of the frame VOP (to 0 when a frame skip is done).

Figure 12:
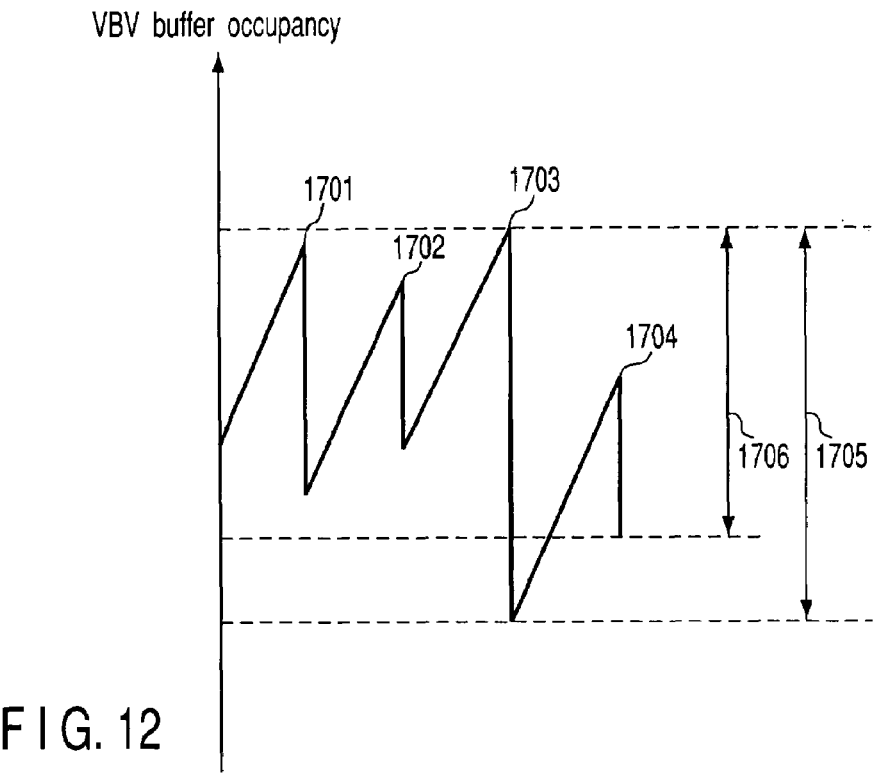
FIG. 12 expresses a change of occupancy of the VBV buffer.

FIG. 12 shows an example of a graph expressing maintenance of the occupancy of the VBV buffer. In FIG. 12, the occupancy of the VBV buffer decreases according to the number of encoded bits output at the times 1701 to 1704. At each time, tolerance of the number of encoded bits is decided according to a kind of the frame VOP and a scene (whether the motion is intense) thereof. It is assumed that the tolerance at the time 1703 is determined to the tolerance 1706.

However, the number of encoded bits of the encoded data may not always be in a range of tolerance. The tolerance at the time 1703 is determined to the tolerance 1706, for example. However, the number of encoded bits obtained by actual encoding is the number of encoded bits 1705 larger than the tolerance 1706.

In such case, the rate controller 1513 controls to increase a quantization scale used in the quantizer 1506. As a result, the number of encoded bits occurring by the variable length encoding decreases, because the amount of information of the quantized DCT coefficients of the frame VOP (encoded on or after the time 1704) to be encoded on the next time is decreased.

In other words, the rate controller 1513 controls the quantizer 1506 to change the quantization scale of the frame VOP to be next encoded according to the occupancy of the VBV buffer and regulate the number of encoded bits.

(Encoding Mode Controller 1514)

As described above, the rate controller 1513 decreases the number of encoded bits based on the quantized DCT coefficients. The number of encoded bits based on the motion vector is not controlled.

However, that the number of encoded bits increases than the tolerance may not be due to the large number of encoded bits based on the quantized DCT coefficients. As described above, in the scene where a movement prediction does not hit, a difference between the motion vectors of a certain block and a block adjacent thereto tends to increase, resulting in increasing the number of encoded bits derived from the motion vector.

In such a scene, a prediction error increases due to a low correlation between the reference frame VOP and the to-be-encoded frame VOP, resulting in increasing the number of encoded bits derived from the quantized DCT coefficients.

Therefore, in the case that the number of encoded bits assigned to one frame VOP is determined beforehand, if the number of encoded bits of the motion vector increases, the number of encoded bits assignable to the quantized DCT coefficient decreases, resulting in deteriorating picture quality largely.

Since particularly the frame B-VOP is subjected to bidirectional predictive encoding, it is thought that the motion vector becomes around 2 times in comparison with the frame P-VOP subjected to the forward predictive encoding. Therefore, the frame B-VOP is easy to decrease in the number of encoded bits assignable to the quantized DCT coefficient, resulting in being liable to deteriorate picture quality in comparison with the frame P-VOP.

Since the frame B-VOP is subjected to bidirectional predictive encoding, the number of times for searching a motion vector increases in comparison with the forward predictive encoding, resulting in increasing computation load. In the situation that a processing time of encoding is restricted to (in, for example, an encoding process of real time) or a situation that the computing power is limited to, it becomes necessary to limit a search range of a motion vector according to quality of computation load occurs. If the search range is narrowed, it becomes difficult to obtain a preferable motion vector of good precision, resulting in deteriorating picture quality.

To avoid such deterioration of picture quality, the encoding mode controller 1514 detects the scene that the bidirectional predictive encoding does not function effectively, and controls the motion detector 1502 and the variable length encoder 1509 so as to restrain use of the bidirectional predictive encoding in such a scene, and encode the picture in intraframe encoding or forward predictive encoding.

The encoding mode controller 1514 determines whether use of the bidirectional predictive encoding should be restrained using quantity of computation load, occupancy of the VBV buffer and the number of encoded bits of the encoded data of the motion vector.

FIG. 13 is a flowchart determining whether the encoding mode controller 1514 restraines use of the bidirectional predictive encoding. The process of the encoding mode controller 1514 is described in conjunction with FIG. 13 hereinafter.

It is examined whether the current computation load received from the computation load measurement unit 1517 exceeds a threshold (step 1801).

When it exceeds the threshold, the encoding mode controller 1514 controls the motion detector 1502 and the variable length encoder 1509 so as to restrain use of the bidirectional predictive encoding to the frame VOP to be encoded subsequently to reduce the computation load (step 1807). When it does not exceed, the process of step 1802 is executed.

The threshold about the computation load is set according to a processing time (whether it is a real time) and the performance of the computer. In the present embodiment, the load of a CPU is used as computation load, but may use computation amount for the encoding process or memory quantity occupied by the input image which is accumulated since the encoding process is in time.

It is examined whether a frame skip occurs (step 1802). When the VBV buffer causes underflow in encoding a certain frame VOP, the frame VOP is skipped without being encoded. In such a case, the encoding mode controller 1514 controls the motion detector 1502 and the variable length encoder 1509 so that use of the bidirectional predictive encoding to the succeeding frame VOP is restrained (step 1807). When the underflow does not occur, the process of step 1803 is executed.

Figure 14:
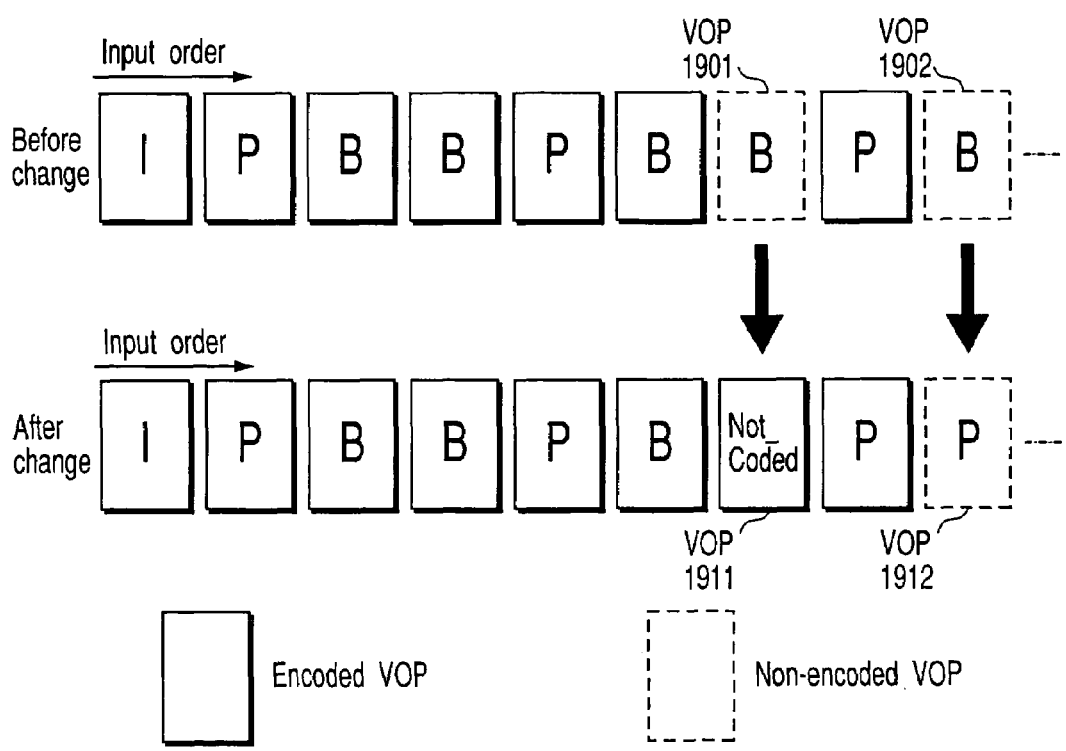
FIG. 14 is a diagram of explaining a state that an encoding mode changes when controling a bidirectional predictive encoding.

FIG. 14 is a diagram of explaining an example that an encoding mode is changed by influence of a frame skip. The frame VOP1902 to be encoded as a frame B-VOP by the bidirectional predictive encoding is encoded as a frame P-VOP (frame VOP1911) by the forward predictive encoding due to the influence (frame VOP1911) that a frame skip occurred at the time of encoding of the frame VOP1901.

That a frame skip occurs at the time of encoding of a certain frame VOP, that is, a VBV buffer causes underflow is that the number of encoded bits more than the assigned number of encoded bits is generated in not only the frame VOP but also several frames VOP encoded therebefore. In other words, it can be predicted that a prediction between the several frames VOP is not hit.

Consequently, use of the bidirectional predictive encoding to the frames VOP on and after the certain frame VOP is restrained, whereby the number of encoded bits of the motion vector is decreased and many encoded bits are assigned to the quantized DCT coefficient.

It is examined whether occupancy of the VBV buffer is apt to decrease (step 1803). When the occupancy of the VBV buffer decrease in several past frames retracing from a time at which a certain frame VOP was encoded, the encoding mode controller 1514 controls the motion detector 1502 and the variable length encoder 1509 so that use of the bidirectional predictive encoding to the succeeding frames VOP is restrained (step 1807). When the occupancy of the VBV buffer is not apt to decrease, the process of step 1804 is executed.

Figure 15:
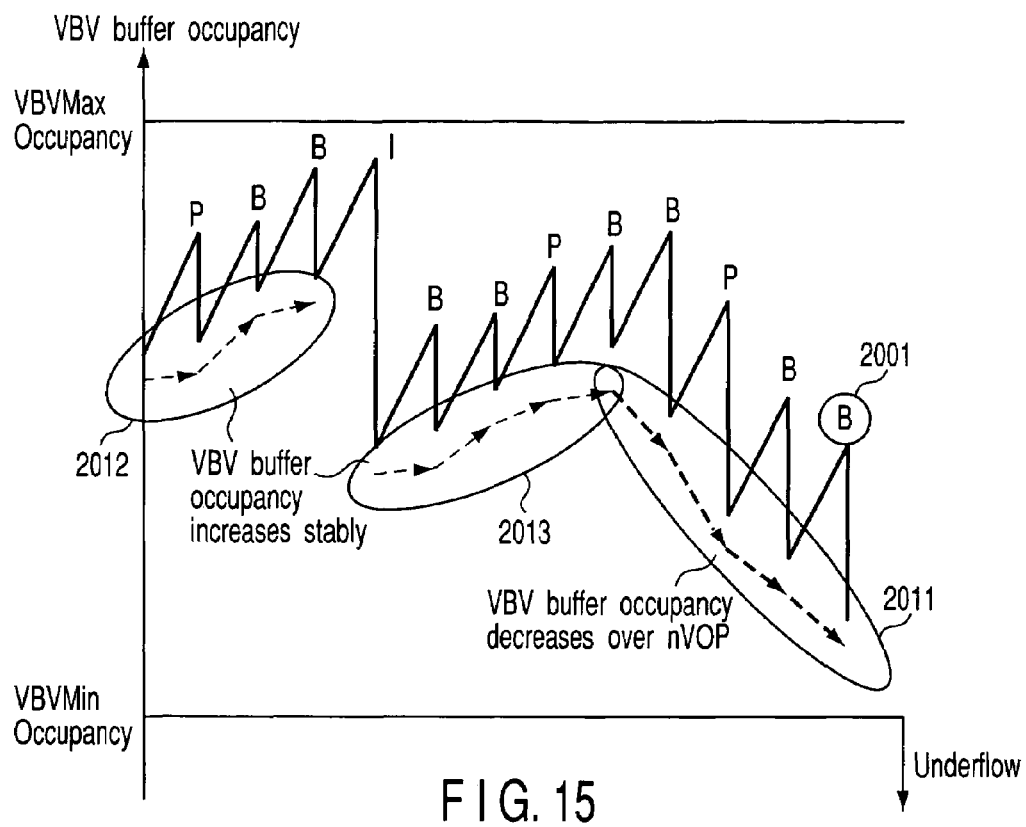
FIG. 15 expresses a change of occupancy of the VBV buffer.

FIG. 15 is a graph of an example to express a change of occupancy of the VBV buffer. The occupancy of the VBV buffer increases in sections 2012 and 2013, but decreases in a section 2011 from a frame VOP2001 to several past frames VOP.

It is thought that it encodes the scene a prediction does not hit that the occupancy of the VBV buffer continues to decrease over several frames VOP. The picture quality can be improved, if the number of encoded bits of the motion vector is reduced and that of the quantized DCT coefficient is increased.

How to check decrease tendency of occupancy of the VBV buffer is described as follows. In the present embodiment, a valley in a graph of occupancy of the VBV buffer (a decrease value when the VBV buffer decreases by the number of encoded bits of each frame VOP) should be noted. When a change rate of the VBV buffer occupancy between the frames VOP indicates a negative value over several given frames VOP, the decrease tendency is determined. However, when the frame VOP subjected to the intraframe encoding exists on the way, the frames VOP that the change rate becomes minus are recounted from 0.

It is examined whether the occupancy of the VBV buffer is less than the threshold (step 1804). When the occupancy of the VBV buffer is less than the threshold in encoding a certain frame VOP, the encoding mode controller 1514 controls the motion detector 1502 and the variable length encoder 1509 to restrain use of bidirectional predictive encoding to the succeeding frames VOP (step 1807). When the occupancy is not less than the threshold, the process of step 1805 is executed.

"The threshold" in this step is a value indicating a property to determine whether the occupancy approaches underflow of the VBV buffer. Therefore, the occupancy less than the threshold indicates a state to be almost underflow.

Such a state is often due to encoding the scene that the motion prediction does not hit. Accordingly, the number of encoded bits of a motion vector is decreased and the large number of encoded bits is assigned to the quantized DCT coefficient, to improve picture quality.

Figure 16:
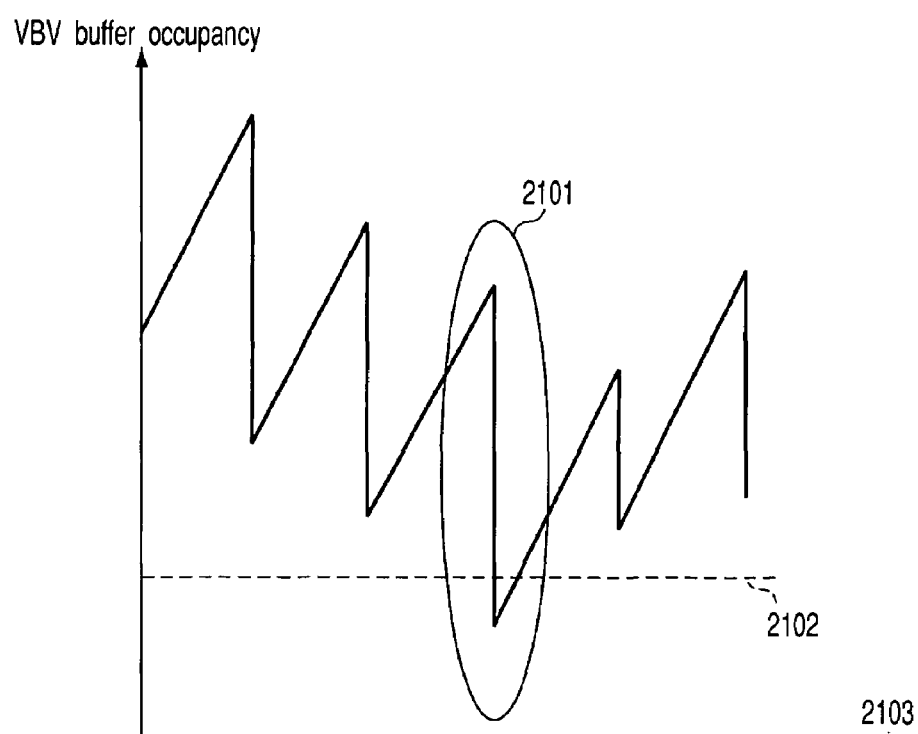
FIG. 16 expresses a change of occupancy of the VBV buffer.

FIG. 16 is an example of a graph expressing a change of occupancy of the VBV buffer. When the frame VOP2101 is encoded, the occupancy is less than the threshold 2102. In such case, this apparatus restrains use of the bidirectional predictive encoding so that the occupancy of the VBV buffer is not less than the lower limit 2103 (in other words, to prevent underflow) (step 1805).

It is examined for encoded data of each frame VOP whether the number of encoded bits of encoded data of the motion vector exceeds the threshold. When the number of encoded bits of a certain frame VOP exceeds the threshold in encoding the certain frame VOP, the encoding mode controller 1514 controls the motion detector 1502 and the variable length encoder 1509 so that use of the bidirectional predictive encoding to the succeeding frames VOP is restrained (step 1807).

When the occupancy is not less than the threshold, use restraint of the bidirectional predictive encoding is released to make it possible to use any encoding mode (step 1806).

Two kinds of threshold values are prepared for in step 1805, and the bidirectional predictive encoding is used or unused according to a use restrained state or a free state. The first threshold is used in the restraint state and the second threshold higher than the first threshold is used in the free state.

In the restraint state, the bidirectional predictive encoding is not used except for a case necessary in an encoding order. Therefore, most frames VOP are encoded in the forward predictive encoding.

As described above, generally, the bidirectional predictive encoding generates encoded bits of a motion vector more than (about 2 times in simple computaion) the forward predictive encoding. If the threshold is set on the basis of the bidirectional predictive encoding in the case of a restraint state, the threshold is so high that the restraint state continues forever.

On the other hand, all encoding modes can be used without a limit in the free state. Therefore, if the threshold is set to a small value on the basis of the forward predictive encoding, the value exceeding the threshold is determined whenever the bidirectional predictive encoding is used.

As mentioned above, the first threshold is used in a use restrained state and the second threshold more than the first threshold is used in the free state. The "free state" for allowing use of all encoding modes is set (step 1806).

The "free state" does not limit the use of all encoding modes. In this situation, the encoding mode applied to each frame VOP is determined according to an input sequence of the frame VOP.

The "use restrained state" for restraining the use of the bidirectional predictive encoding is set (step 1807). In the "use restrained state", the bidirectional predictive encoding is not used exept for a case needing the bidirectional predictive encoding owing to an order of frames to be encoded. Therefore, most frames VOP are encoded in the forward predictive encoding. If necessary, the order of frames to be encoded is changed according to a change of the encoding mode.

Assuming that, in MPEG-4, the encoding mode is determined on an order of P1→B2→B3→P4→B5→B6→P7 according to an input sequence of frames VOP. In this time, the order of frames to be encoded is an order of P1→P4→B2→B3→P7→B5→B6.

Assuming that when the frame B3 is encoded, an either condition of steps 1801 to 1805 is satisfied and thus the "use restrained state" is set. Then, the frame to be next encoded is the frame P7 normally. However, since the use of the bidirectional predictive encoding is restrained, the frames B5 and B6 too must be encoded by the forward predictive encoding. Therefore, the frames are encoded in an order of B3→B5→B6→P7.

In another example, if a condition of either of steps 1801 to 1805 is satisfied when the frame B3 was encoded, the frame B3 to be next encoded and the frames following thereto are in the "use restrained state".

However, at this point it is not possible for simplicity to change the encoding mode of the frame B3 to the forward predictive encoding, because the frame P1 is encoded as a reference frame VOP and the frame P4 is encoded in the forward predictive encoding.

In such case, the frame B3 is encoded by the bidirectional predictive encoding. The frame order for encoding is changed so that the frames are encoded in an order of B3→B5→B6→P7 with the frame B5 and the frames following thereto being encoded by the forward predictive encoding.

If a real time processing is not needed or the apparatus has a sufficient encoding throughput owing to the use of a high performance arithmetic processing unit, the frame B3 may be encoded by the forward predictive encoding and the encoding of the frame P4 may be repeated using the frame B3 as a reference frame VOP. This correspondes to the "ban on use" described before. The frame B3 may be encoded as "encoding uselessness frame" having no motion vector and no DCT coefficient.

As described above, the encoding mode controller 1514 determines the "use restrained state" or "free state" of the bidirectional predictive encoding by the processing of steps 1801 to 1807. The encoding mode controller 1514 controls the motion detector 1502 and the quantizer 1506 to control the encoding mode.

Since the present embodiment grasps the current encoding mode from the VBV buffer occupancy or the number of encoded bits of a motion vector, it can suppress the deterioration of the picture quality with low computation costs.

When the computation load is high, the encoding mode of a low computation load is adopted. Therefore, the deterioration of the picture quality can be suppressed in the real time encode process.

As discussed above, according to the first embodiment of the present invention. The motion vectors and SAD values of all frames VOP between the frame P-VOP and the reference frame VOP referred to for the frame P-VOP are used for determination of "not not_coded" macroblock in encoding the frame P-VOP. As a result, even if only the interposed frame B-VOP is largely changed in picture, generation of "not_coded" macroblock is retrained, resulting in suppressing deterioration of the picture quality of the frame B-VOP.

According to the second embodiment of the present invention, In a conversion apparatus for converting from MPEG-2 to MPEG-4, when use of "not_coded" macroblock is determined in encoding the frame P-VOP, not only the presence of skipped macroblock of the P-picture corresponding to the frame P-VOP, but also a problem when all B-pictures interposed between the P-picture and a reference picture therefor are processed is determined. As a result, the deterioration of picture quality of the frame B-VOP in a MPEG-4 bit stream after conversion can be suppressed.

According to the third embodiment of the present invention, the number of encoded bits of a motion vector is suppressed and thus many encoded bits can be assigned to a quantized DCT coefficient. Hence, deterioration of picture quality can be restrained.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A video encoding apparatus to encode a video by MPEG-4, comprising:
   an encoder to encode each VOP (video object plane) of the video;
   a computation module configured to obtain the number of encoded bits generated by encoding a first VOP of the video;
   a memory to store a threshold; and
   a control module configured to compare the number of encoded bits of the first VOP with the threshold, and control the encoder to encode a second VOP to be encoded next to the first VOP as one of an intraframe encoded VOP, a forward predictive encoded VOP and a not_coded VOP when the number of encoded bits exceeds the threshold.

2. A video encoding apparatus to encode a video by MPEG-4, comprising:
   an encoder to encode each VOP (video object plane) of the video;
   a computation module configured to obtain the number of encoded bits generated by encoding a first VOP of the video;
   a presume module configured to presume occupancy of a VBV buffer that is a virtual buffer of a virtual decoder side by using the number of encoded bits;
   a control module configured to control the encoder to encode a second VOP to be encoded next to the first VOP as one of an intraframe encoded VOP, a forward predictive encoded VOP and a "not_coded" VOP, according to a change of the occupancy of the VBV buffer.

3. A video encoding method comprising:
   encoding each picture of a video by MPEG-4;
   computing the number of encoded bits generated when encoding a first VOP (video object plane);
   comparing the number of encoded bits of the first VOP with a threshold; controlling the encoding to encode a second VOP to be encoded next to the first picture as one of a forward predictive encoded VOP, an intraframe encoded VOP and a not_coded VOP, when the number of encoded bits of the first VOP exceeds the threshold.

4. A video encoding method comprising:
   encoding each VOP (video object plane) of a video by MPEG-4;
   computing the number of encoded bits generated when encoding a first picture;
   presuming occupancy of a VBV buffer that is a virtual buffer of a decoder side, by using the number of encoded bits,
   controlling the encoding to encode a second VOP to be encoded next to the first VOP as one of a forward predictive encoded VOP, an intraframe encoded VOP and a not_coded VOP, according to a change of the occupancy of the VBV buffer.

* * * * *